(12) United States Patent
Kvochko et al.

(10) Patent No.: US 11,316,881 B2
(45) Date of Patent: Apr. 26, 2022

(54) JUST SHORT OF IDENTITY ANALYSIS

(71) Applicant: Bank of America Corporation, Charlotte, NC (US)

(72) Inventors: Elena Kvochko, New York, NY (US); Maria Carolina Barraza Enciso, New York, NY (US); Michael Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 216 days.

(21) Appl. No.: 16/745,507

(22) Filed: Jan. 17, 2020

(65) Prior Publication Data

US 2021/0226968 A1 Jul. 22, 2021

(51) Int. Cl.
*G06F 15/16* (2006.01)
*H04L 29/06* (2006.01)
*G06F 16/953* (2019.01)

(52) U.S. Cl.
CPC ........ *H04L 63/1425* (2013.01); *G06F 16/953* (2019.01)

(58) Field of Classification Search
CPC .......................... H04L 63/1425; G06F 16/953
See application file for complete search history.

(56) References Cited

U.S. PATENT DOCUMENTS

| | | | |
|---|---|---|---|
| 1,026,199 | A | 5/1912 | Bullard |
| 7,046,138 | B2 | 5/2006 | Webb, Sr. |
| 8,162,207 | B2 | 4/2012 | Bosch et al. |
| 8,887,286 | B2 | 11/2014 | Dupont et al. |
| 9,282,070 | B2 | 3/2016 | Haugen et al. |
| 9,471,883 | B2 | 10/2016 | Chatterjee et al. |
| 10,007,661 | B2 | 6/2018 | Arquero et al. |
| 10,031,909 | B2 | 7/2018 | Blaschak et al. |

(Continued)

FOREIGN PATENT DOCUMENTS

NZ    577674    4/2012

OTHER PUBLICATIONS

Luis Gomez, "Thousands of San Diego Street Lights are Equipped with Sensors and Cameras. Here's What They Record." https://www.sandiegouniontribune.com/opinion/the-conversation/sd-san-diego-street-light-sensors-how-they-work-20190318-htmlstory.html, The San Diego Union Tribune, Mar. 18, 2019.

(Continued)

*Primary Examiner* — Ryan J Jakovac
(74) *Attorney, Agent, or Firm* — Weiss & Arons LLP

(57) ABSTRACT

A method for analyzing communications on the internet to identify a probability of an occurrence of an anomalous event relating to a pre-determined entity is provided. The method may include searching on the internet, to identify communications comprising negative sentiment associated with the pre-determined entity. When identified, the method may include further searching for communications including data regarding a physical location and an intended action, both being associated with the pre-determined entity. When one or more instances of these communications are identified, the method may include activating smart sensors embedded within proximity to the identified physical location to capture non-identifiable data and transmit the captured data to a data analysis engine to identify and confirm a probability of the occurrence of the anomalous event.

17 Claims, 6 Drawing Sheets

(56) References Cited

U.S. PATENT DOCUMENTS

| | | |
|---|---|---|
| 10,050,926 B2 | 8/2018 | Ebersman et al. |
| 10,169,558 B2 | 1/2019 | Huang et al. |
| 10,313,520 B2 | 6/2019 | Dwyer et al. |
| 10,353,898 B2 | 7/2019 | Kawecki, III |
| 10,404,784 B2 | 9/2019 | Parthasarathi et al. |
| 10,438,207 B2 | 10/2019 | Subhedar et al. |
| 2014/0337257 A1 | 11/2014 | Chatterjee et al. |
| 2017/0069051 A1 | 3/2017 | Petitt, Sr. et al. |
| 2017/0185921 A1 | 6/2017 | Zhang |
| 2018/0089171 A1 | 3/2018 | Arquero et al. |
| 2019/0236342 A1* | 8/2019 | Madden ........... G08B 13/19602 |

OTHER PUBLICATIONS

Erin Oneil, "How ATMs Can Use Biometrics to Combat Fraud," https://www.thebalaace.com/atms-use-biometrics-to-combat-fraud-315794, Feb. 28, 2019.

"Facial Expression Analysis: The Complete Pocket Guide," https://imotions.com/blog/facial-expression-analysis/, IMotions, Feb. 19, 2016.

"Facial Expression Analysis," https://www.noldus.com/facereader/facial-expression-analysis, Noldus, Retrieved on Dec. 16, 2019.

"Dark Web," https://en.wikipedia.org/wiki/Dark_web, Wikimedia Foundation, Inc., Dec. 10, 2019.

\* cited by examiner

JUST SHORT OF IDENTITY ANALYSIS

FIELD OF TECHNOLOGY

Aspects of the disclosure relate to analyzing communications on the internet.

BACKGROUND OF THE DISCLOSURE

Since the advent of the digital world, the internet has provided and continues to provide a source of opinionated information. This information may be culled from a variety of internet channels in which an entity may voice an opinion. Such internet channels may include blogs, emails, social media, chats, text messaging, message services or any other suitable opinion-voicing channel. Because of the ease associated with providing opinions, testimonials and comments on the internet, there has been a proliferation of written opinions available regarding a wide variety of topics.

Opinionated information is used by various industries for a variety of purposes. Opinions may be used to understand the public's attitude towards a product, company or relationship. Public discourse in online sources, such as social media, may be correlated with the occurrence of real-world behavior.

Entities may benefit from analyzing the opinionated information from these public internet channels to get a better feel of the public's attitude towards their company. Entities may also benefit from analyzing these public internet channels to detect any negative sentiment within these channels that may infer/hint to plans of carrying out intended actions against the entity.

It would be desirable therefore, to provide systems and methods for analyzing the sentiment of communications on the internet to protect and minimize probabilities of the occurrence of physical and cyber-attacks.

It would further be desirable to provide systems and methods to monitor physical and cyber locations where there is a detection of the probability of the occurrence of a physical and/or cyber-attack in order to prevent or at least mitigate an attack.

SUMMARY OF THE DISCLOSURE

Aspects of the disclosure relate to systems and methods for analyzing communications on the internet to identify a probability of an occurrence of an anomalous event. The anomalous event may be related to a pre-determined entity.

Systems and methods may enable taking one or more remedial measures to mitigate the probability of the occurrence of the anomalous event.

The method may include searching periodically, one or more webpages, via a data analysis engine associated with a centralized server. The searching may enable identifying communications including negative sentiment associated with the pre-determined entity.

The method may include identifying, during the searching, one or more communications comprising negative sentiment associated with the pre-determined entity.

In response to the identifying, the method may include performing a keyword search on the one or more webpages. The keyword search may include searching to identify a communication including at least a first keyword and a second keyword. The first keyword may be a word and/or words that identify a physical location. The location may be associated with the pre-determined entity. The location may be a physical location where the pre-determined entity resides. The second keyword may be a word and/or words that identify an intended action linking to the pre-determined entity. The second keyword may be within a predetermined proximity to the first keyword.

In response to the performance of the keyword search, the method may include identifying the communication that may include at least the first keyword and the second keyword.

Following identifying the communication, the method may include executing, on the one or more webpages, a targeted keyword search. The targeted keyword search may identify one or more instances of the first and second keywords identified on the communication.

When one or more instances are identified, the method may include switching a status of a plurality of smart sensors embedded within proximity to the identified location. The plurality of smart sensors may switch their state from a passive state to an active state. The plurality of smart sensors may be in communication with the centralized server.

The active state may instruct each of the smart sensors to capture non-personally identifiable data. Some of the plurality of smart sensors may be enabled to capture biometric data positioned proximal to each of the smart sensors. Some of the plurality of smart sensors may be enabled to capture non-personally identifiable facial sentiment/expression data positioned proximal to each of the smart sensors.

It should be appreciated that both the biometric sensors and the facial sentiment sensors are configured to capture only data that does not identify the identity of an individual. Data that may reveal the identity of an individual may not be desired. It is preferred that non-personally identifiable data be used to assist in identifying any signs of intended actions being planned within proximity of the physical location.

It should be appreciated that the capturing and/or any means of storing the captured data may be in compliance regulations including the General Data Protection Regulation ("GDPR"), the Health Insurance Portability and Accountability Act ("HIPAA"), the Fair Credit Reporting Act ("FCRA"), the Electronic Communications Privacy Act ("ECPA") and the California Consumer Privacy Act.

The capturing may not retain any identity identifying information associated with any one or more individuals. The capturing may preferably blur features that may identify the identity of the individual(s) in order to block the identity of the individual(s).

The capturing may preferably only enable retaining the data that assists in identifying a mood, behavior and/or expression of the individual(s). This may include retaining mouth, nose and eye positions and any other suitable biometric information that may assist in detecting the mood and expressions of the individual(s).

Following the capturing of the data, the method may include transmitting the captured biometric data and the captured facial sentiment data to the centralized server.

The method may include, via an data analysis engine linked to the centralized server, analyzing the captured biometric and facial sentiment data. The analyzing may enable confirming the probability of the occurrence of the anomalous event being above a threshold probability occurrence.

In response to the confirming, the method may include transmitting a message to an associated security entity.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
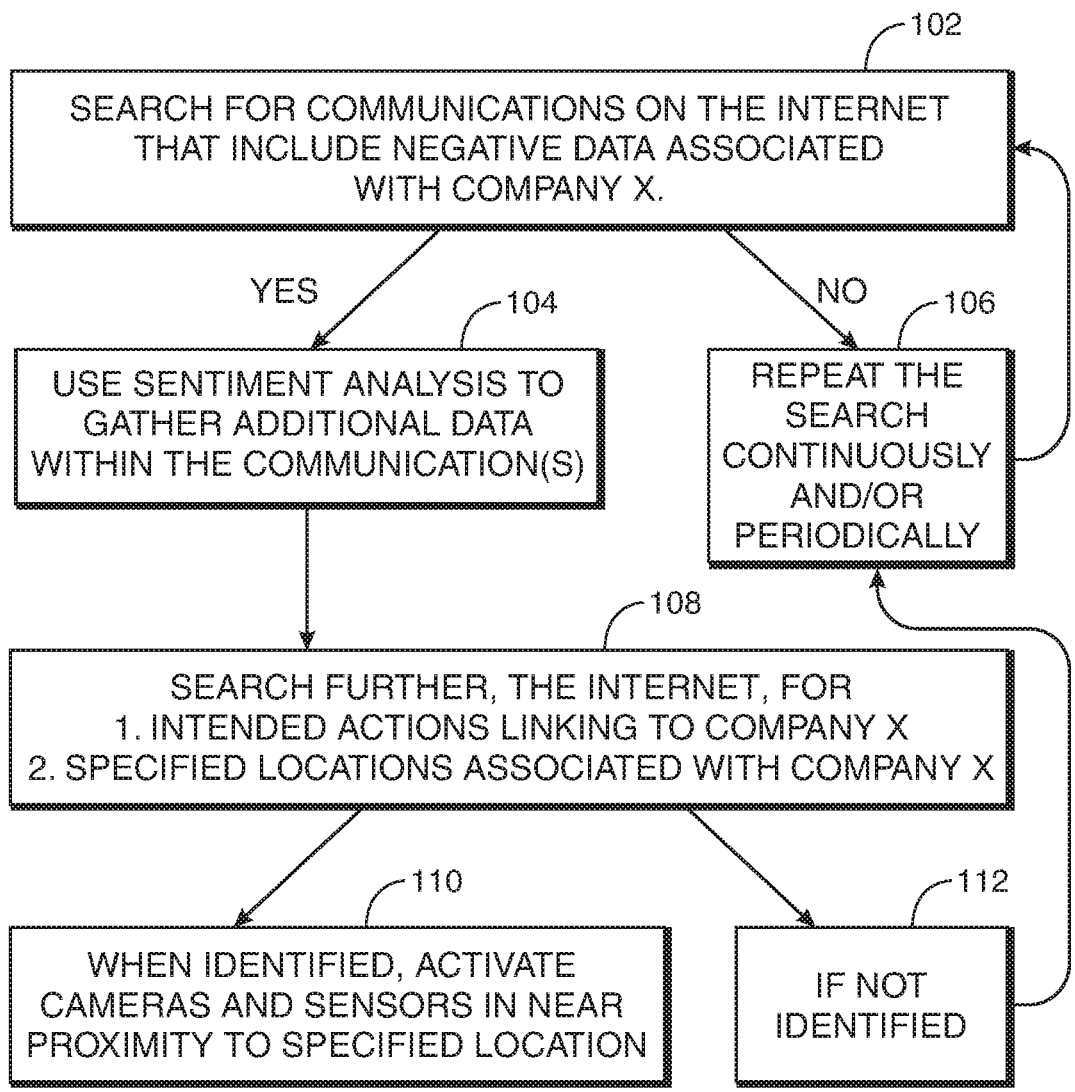
FIG. 1 shows a flowchart in accordance with principles of the invention.

Systems and methods for analyzing communications on the internet are provided. The system may enable identifying a probability of an anomalous event. The anomalous event may be related to a pre-determined entity. The anomalous event may be linked to a plan for a physical attack on a physical location(s) or a cyber-attack on a virtual location associated with the pre-determined entity.

The system may enable taking one or more remedial measures to mitigate the probability of the occurrence of the anomalous event.

The system may include a centralized server. The centralized server may be in communication with the pre-determined entity. The centralized server may include a data analysis engine. The data analysis engine may be an application on the server that may be able to analyze communications on the internet.

The data analysis engine may be configured to search, one or more webpages to identify communications associated with the pre-determined entity. The searching may be a periodic search. The search may be a constant and continuous search. The data analysis engine may also be configured to search for the communications associated with the pre-determined entity that include negative sentiment data. The searching may be a first search.

Communications may include a letter, instant messages ("IMS"), chat, email, short message service ("SMS") and phone call.

The searching may be performed on all publicly available areas of the internet. This may include but may not be limited to, searching social media blogs, Facebook®, Twitter® and the Dark Web.

During the search, the data analysis engine may identify, one or more communications comprising negative sentiment data associated with the pre-determined entity. The system may use sentiment analysis to analyze the one or more communications and enable identifying the level of negative sentiment included in the communication directed towards the pre-determined entity.

The analyzing may include determining a sentiment score for the one or more communications. The score may be based on natural language processing, computational linguistics, biometrics and the text analysis. The text analysis may analyze key words and phrases, emoticons, characters, negation, exaggerations, jokes and/or sarcasm.

In some embodiments, when at least one of the one or more communications includes a sentiment score being above a predetermined threshold, the data analysis engine may be configured to continue a search for additional communications being more closely directed to an intention of performing an anomalous act and/or initiating an anomalous event on the pre-determined entity.

In response to the identifying, the data analysis engine may be configured to perform a keyword search on the one or more webpages. The keyword search may be a second search. The keyword search may enable identifying further, communications more directly linked to an intention of negatively affecting the pre-determined entity and/or a location associated with the pre-determined entity.

The keyword search may include searching to identify a communication comprising at least a first keyword and a second keyword both included in the communication. The first keyword may identify a physical location associated with the pre-determined entity. The location may be a word(s) that identify a name of a street, city and/or area within a city. The physical location may be the place where the pre-determined entity may have a brick and mortar workplace. The workplace may be the headquarters and/or one or more branches associated with the pre-determined entity.

The second keyword may be a word(s) that may identify an intended action being planned. The second keyword may be included in the same communication as the first keyword and may be within a predetermined proximity to the first keyword. In some embodiments, the predetermined proximity of the second keyword to the first keyword may be within zero to ten words.

The intended action may be linked to the pre-determined entity. The intended action may be an anomalous event being planned against the pre-determined entity.

When an identification of a communication (s) including at least the first keyword and the second keyword is identified on the one or more webpages, the system may then be enabled to perform an additional search. The additional search may be a targeted keyword search. The targeted keyword search may be to identify one or more instances of the first and second keywords identified on the communication. The targeted keyword search may be a third search.

For example, results of a first search may identify one or more communications including negative sentiment towards the pre-determined entity. Results of a second search may identify a communication including the first and second keyword associated with the pre-determined entity. The first keyword may be the location 'street X.' The second keyword may be an intended action of 'remove them.' Sentiment analysis may be able to derive a probability of an intended action from the word 'remove.' The system may perform the third search using the 'street X' and the 'remove them' as the keywords.

In the event that one or more instances of communications including the first and second keyword are not identified, the system may be configured to continuously and/or periodically repeat searching the internet for communications directed to the pre-determined entity and including negative sentiment. The system may not alert the pre-determined entity solely based off of communications including negative sentiment without further identification of intended actions and/or anomalous events targeted at the pre-determined entity.

When one or more communications are not identified to include a first and second keyword, the system may be configured to repeat the first search of periodically searching for identifying communications associated with the pre-determined entity that may include negative sentiment data.

In the event that one or more instances are identified that include at least both the first and second keyword, both being associated with the pre-determined entity, the system may perform a high level of security within the area of the identified location. The high level of security may be performed by a network of smart sensors within the system. The high level of security may enable identifying the probability of an occurrence of an anomalous event on the entity's headquarters located within the area of the identified location.

These smart sensors may be positioned at or near the identified location. For example, the pre-determined entity may have numerous sensors surrounding an office building associated with the entity. The sensors may be in close proximity to the building. The sensors may also be positioned in the surrounding area of at least a few hundred feet from the building. This enables a greater level of security and protection for the pre-determined entity.

Each smart sensor may include a sensor, a microprocessor and supporting wireless communication. The network of smart sensors may be in direct communication with the centralized server. The network of smart sensors may be configured to monitor non-personally identifiable attributes.

Smart sensors may include a camera, radar, infrared and/or any other techniques that may enable capturing non-identifiable data without making contact to an individual.

The network of smart sensors may be configured to switch from a passive state to an active state. The active state may enable instructing the smart sensors in capture non-personally identifiable biometric data positioned proximal to each of the smart sensors. Biometric data may include a first biometric characteristic, a second biometric characteristic, a third biometric characteristic and a fourth biometric characteristic. The sensors that may be enabled to capture the biometric data may be heat sensors.

The active state may also enable instructing the smart sensors to capture non-personally identifiable facial sentiment data positioned proximal to each of the smart sensors. Facial sentiment data may include using facial expressions to identify moods and emotions.

Facial expressions captured may enable identifying the emotions of an individual. The emotions may include happiness, surprise, disgust, sadness, fear and anger. Systems and methods may implement automatic facial expression recognition procedures, in accordance with principles of the invention, to instantaneously detect expressions and recognize emotional states. These technological procedures may use cameras to capture an image and then analyze the facial expression in the image.

Within the captured image, the facial landmarks that may be detected may include eyes and eye corners, brows, mouth corners and the nose tip. The positions of each of these facial landmarks may enable identifying the type of expression associated with the image.

It should be appreciated that both the biometric sensors and the facial sentiment sensors are configured to capture only data that does not identify the identity of an individual. In accordance with principles of the invention, data that may reveal the identity of an individual may not be desired. It is preferred that non-personally identifiable data be used to assist in identifying any signs of intended actions being planned within proximity of the physical location. For example, an abnormal first biometric characteristic, an abnormal second biometric characteristic and fearful facial expressions may be the signs of the probability of the occurrence of an intended action. In this example, the first biometric characteristic, the second biometric characteristic and facial expressions preferably does not reveal the identity of an individual but may reveal the probability of an intended action.

To the extent that it may be necessary to capture personally identifying information, this should be done only in circumstances of clear and present ("C and P") danger and preferably upon receipt of consent of relevant individuals involved.

Prior to the analyzing of the captured data, the capturing of the data may also include implementing well known methods to blur and obfuscate any data that can identify the identity of the individual. Facial landmarks that assist in identifying the moods and expressions without identifying the individual may be retained and stored for analysis.

The algorithms that may be used to identify the types of expression may access databases of facial expressions from all over the world. The algorithms may also incorporate machine learning algorithms in order to improve the accuracy of the identifying the types of facial expressions.

The smart sensors may transmit the captured data to the centralized server. In response to the receipt of the captured biometric data and facial sentiment data, the centralized server may be configured to analyze the data. The centralized server may use a data analysis engine to analyze the captured data. The data analysis engine may be an application. The application may include software configured to perform the analysis.

The analyzing may enable identifying a stability of one or more individuals that may be located within proximity to the identified location. The stability of an individual may be identified by the first biometric characteristic, the second biometric characteristic, the third biometric characteristic and dilation of pupils. When any one of these are not within the normal range, it may be a sign of instability which may be due to fear, stress, anger and/or danger.

The analyzing may include comparing the captured first biometric characteristic, second biometric characteristic and third biometric characteristic to a pre-determined standard first biometric characteristic, second biometric characteristic and third biometric characteristic. The comparing may include assigning a score to each of the first biometric characteristic, second biometric characteristic and third biometric characteristic. It should be appreciated that in some embodiments there may be only one captured rate captured by the one or more sensors.

The scoring may use methods of scoring used when analyzing sentiment. When the comparison of the captured biometric and facial sentiment data is outside the pre-determined rate/range, the scoring may be assigned a negative sentiment score. When the captured data is within closer proximity to the pre-determined range, the assigned score may be a more positive sentiment score than a negative sentiment score. When the captured data is not within close proximity to the pre-determined range, the assigned score may be a more negative sentiment score then a positive sentiment score.

In some embodiments, a captured heart rate may be compared to an average heart rate. For example, the average heart rate for an individual walking briskly may be between 110 and 120 beats per minute ("bpm"). The average heart rate when an individual is at rest may be between 60-100 bpm. The pre-determined heart rate may be a range between 60 and 120 bpm. When the captured heart rate is above 120 bpm, the scoring may be a more negative sentiment score.

In some embodiments, a captured blood pressure may be compared to a pre-determined standard blood pressure. The analyzing may include scoring the blood pressure by comparing the blood pressure to the pre-determined standard Hood pressure.

In some embodiments, a captured respiratory rate may be a rate of breathing. When the breathing rate increases outside a normal rate, this may be an indication of stress. The average respiratory rate may be 12-20 breaths per minute for an individual 6 years old and up. The analyzing may compare the captured respiratory rate to the pre-determined rate of 12-20 breaths per minute. The sentiment score may be a more negative sentiment score when above the rate of 20 breaths per minute.

Following the assigning of a score to each of the captured heart rate, blood pressure and respiratory rate, the data analysis engine may add the score to get a total score. The data analysis engine may then determine an average score based off the total score. The total score may be a total of at least two of heart rate score, blood pressure score and respiratory rate score.

The average score may enable determining the level of sentiment in the area in which the sensors are situated. When the average score is above a pre-determined threshold level, the system may be enabled to confirm the probability of the occurrence of the anomalous event. Based off of the confirmation, alerts may be sent out to notify the pre-determined entity and security personnel to take remedial security measures.

When either one or both of the facial sentiment data and biometric data is above the normal/typical level, this may be associated with the individuals experience with the external stimuli. This may be associated with the individual itself in the event that the individual may be associated with the planning of the intended action and/or anomalous event.

Based on an analysis of the captured biometric and facial sentiment data, the data analysis engine may confirm a probability of an occurrence of the anomalous event being above a threshold probability occurrence.

In response to the confirming, the system may be configured to send a message to a security entity, the security entity being associated with the pre-determined entity.

Security measures and precautionary measures may be implemented by the security entity at the specified location. Security measures may also be implemented at any one or more locations not specified but may be also be associated with the pre-determined entity. The security measures taken may include a heightened level of security—i.e.—police stationed in the surrounding area.

In some situations, when the analyzing of the captured data returns a high score of negative sentiment, there may be a lock-down on the entity's actual building and surrounding area.

It should be appreciated that the system is configured to use both sentiment analysis and facial sentiment analysis. The sentiment analysis may be performed on the communications on the internet. The facial sentiment analysis may be performed on the captured data from the sensors. The facial sentiment analysis may enhance the validity of the confirming of the probability of an anonymous event occurring at the intended location.

In some embodiments captured data may be assigned a negative sentiment score but after analyzing may be determined that the negativity may not be due to fear or danger. The negativity may be: identified because of poor health in an individual and/or excitement of one or more individuals. Both poor health and excitement can cause an increase in the first biometric characteristic and the second biometric characteristic as well. Machine learning algorithms, in certain embodiments, may be able to define and identify whether the increase is from fear and danger or from poor health and/or excitement. In such embodiments, the sensors, may continue to capture data hut the rate of capturing may be decreased. Furthermore, security in the identified location may also be reduced or halted.

In certain embodiments, a network of smart sensors positioned within proximity to a predetermined entity's locale may be provided. The network of smart sensors may act as a security gateway for a protection of the predetermined entity's locale.

Each smart sensor may include a sensor, a microprocessor and supporting wireless communication. The network of smart sensors may be in direct communication with a centralized server. The centralized server may be associated with and in communication with the predetermined entity. The network of smart sensors may be configured to monitor non-personally identifiable attributes.

The network of smart sensors may include biometric sensors. The biometric sensors may be configured to capture non-personally identifiable biometric data positioned proximal to each of the smart sensors. The biometric sensors may also be configured to transmit the captured non-personally identifiable biometric data to a data analysis engine associated with the centralized server.

The network of smart sensors may also include facial sentiment sensors. The facial sentiment sensors may be configured to capture non-personally identifiable facial sentiment data positioned proximal to each of the smart sensors. The facial sentiment sensors may also be configured to transmit the captured non-personally identifiable facial sentiment data to the data analysis engine associated with the centralized server.

The data analysis engine may be configured to analyze the data using sentiment analysis. When at least one of the captured non-personally identifiable facial sentiment data and biometric data is outside a pre-determined range the data analysis engine may assign a negative sentiment score and transmit the negative sentiment score to the centralized server. The centralized server, based on the negative sentiment score, may confirm a probability of an occurrence of an anomalous event being above a threshold probability occurrence. In response to the confirming, the centralized server may transmit a message to a security entity associated with the predetermined entity.

When each of the captured non-personally identifiable facial sentiment data and biometric data is within the pre-determined range, the data analysis engine may assign a positive sentiment score and transmit the positive sentiment score to the centralized server.

The capturing of non-personally identifiable facial sentiment data may include capturing facial landmarks. The facial landmarks may include at least one of eyes and eye corners, brows, mouth corners and a nose tip. By analyzing these facial landmarks, the data analysis engine may be enabled to identify the type of facial expression. The type may be a more negative or more positive facial expression. Based on the type of facial expression, the data analysis engine may be enabled to assign the score.

The capturing, of non-personally identifiable biometric data may include capturing at least one of a first biometric characteristic and a second biometric characteristic.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative flowchart of a system 100 for analyzing internet communications in accordance with principles of the invention. At a first step 102, the system may search for communications on the internet that may include negative data associated with 'company X.'

When one or more communications are not found to include negative data associated with 'company X' the system may continue to search the internet, as shown at 106. The system may repeat step 102 periodically to be able to monitor the security for 'company X.' The system may repeat step 102 at a continuous pace.

When one or more communications including negative data associated with 'company X' are identified, the system may perform a sentiment analysis on the one or more communications to gather additional data within the communications, as shown at 104. The additional data may enhance the determination of the probability of the occurrence of an anomalous event towards the pre-determined entity.

Once communications with negative data associated to 'company X' are identified, the system may perform a more in-depth search to look for hints of potential attempts to perform intended actions on the entity. The intended actions may be directed to an actual physical location and/or building site of the 'company X.'

At step 108, the system may perform the more in-depth search. The system may search the internet for communications including two keywords. The first keyword may include word(s) identifying an intended action linking to 'company X.' The second keyword may include word(s) specifying location(s) associated with 'company X.'

At step 112, when the in-depth search does not return results of communications including both the first and second keyword, the system may repeat the searching at step 106.

At step 110, the system may identify one or more communications including both the first and second keyword and may trigger an activation of security cameras and sensors located in near proximity to the specified location and enable actively capturing data. The security cameras and sensors may be configured to only capture data that does not identify the identity of an individual. It may only capture data that may assist in identifying the sentiment within proximity of the location.

Figure 2:
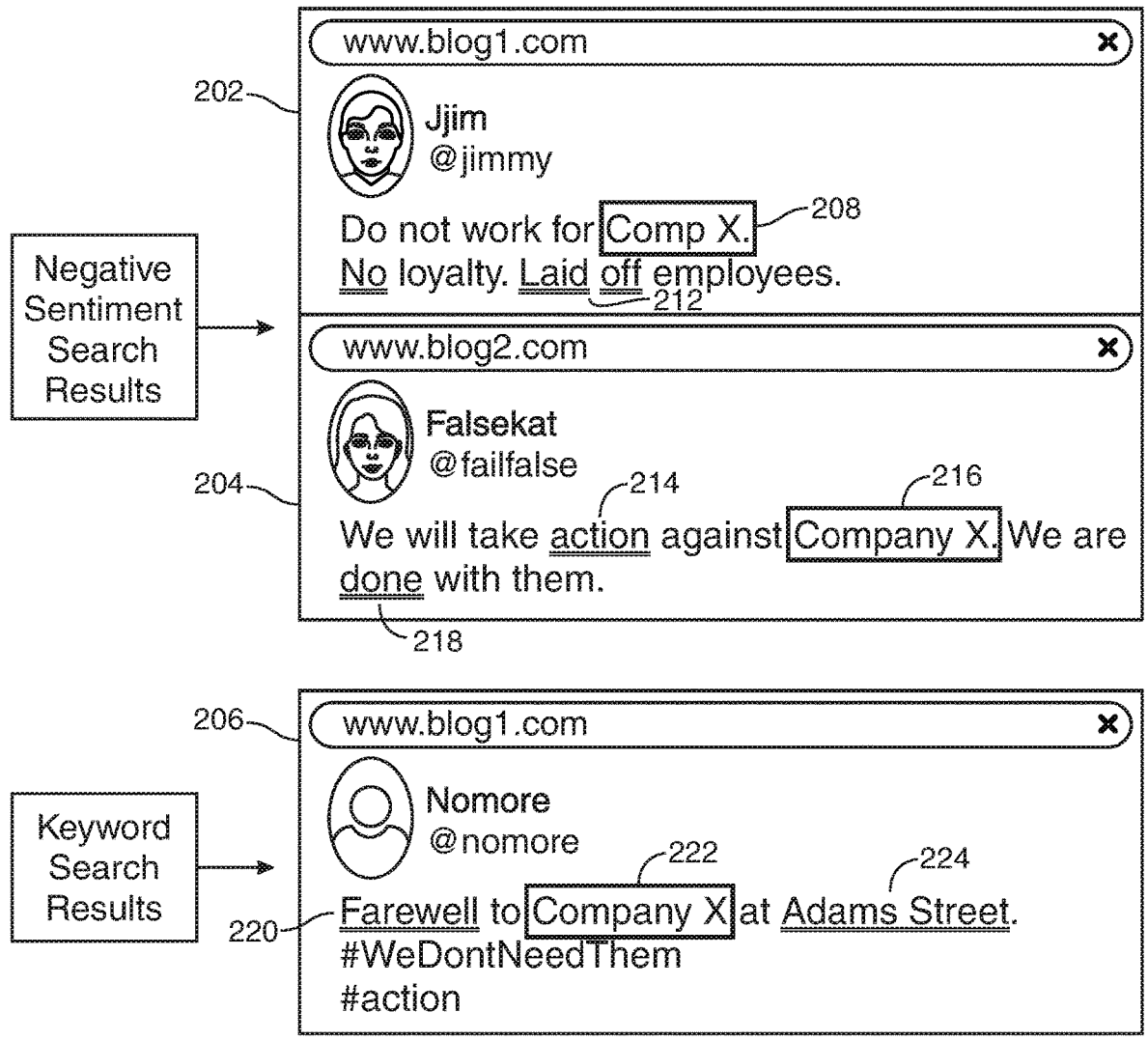
FIG. 2 shows an illustrative diagram in accordance with principles of the invention.

FIG. 2 shows an illustrative diagram 200 of results from an interne search to identify communications including negative sentiment towards a pre-determined entity. The first search may be to identify any one or more communications including negative sentiment towards the pre-determined entity. The negative sentiment analysis may be performed by a computer application. The computer application may implement one of the sentiment analysis methods described in FIGS. 3, 4 and 5.

At display box 202 and 204 the results of the negative sentiment search may be displayed. The first result 202 may be from one webpage and the second result 204 may be from a second webpage.

In this exemplary diagram, the pre-determined entity may be entity X (referred to herein as 'company X'). Result 202 may be a message displayed in a blog or on any social media website. The message includes the text "Do not work for Company X. No loyalty. Laid off employees." The message includes the pre-determined entity 208, 'company X', and also includes at least the negative sentiment shown at 210 and 212.

Result 204 may be a message displayed in a blog or on any social media website. The message includes the text "We will take action against Company X. We are done with them." The search identified the message since it includes the pre-determined entity, as shown at 216. The message also includes at least the negative sentiment as shown at 214 and 218.

Following the results 202 and 204, a keyword search may be performed. The keyword search, in this exemplary diagram 200 may return result 206. The keyword search may search to identify communications that identify a name of a physical location and an intended action, both being associated with the pre-determined entity. Result 206 may be a message. The message includes the text "Farewell to Company X at Adams Street. #WeDontNeedThem #action." The pre-determined entity is identified as shown at 222. The word 'farewell', as shown at 220, may be the keyword identifying an intended action associated with the pre-determined entity. The words 'Adams Street', as shown at 224, may be the keyword identifying a name of a location associated with the pre-determined entity.

Result 206 may be an indication of a probability of an occurrence of an anomalous event to occur at a physical location associated with the pre-determined entity. These search results, that may be performed by the data analysis engine on the centralized server associated with the pre-determined entity may trigger an alert to the pre-determined entity to heighten the security in the identified physical location.

Figure 3:
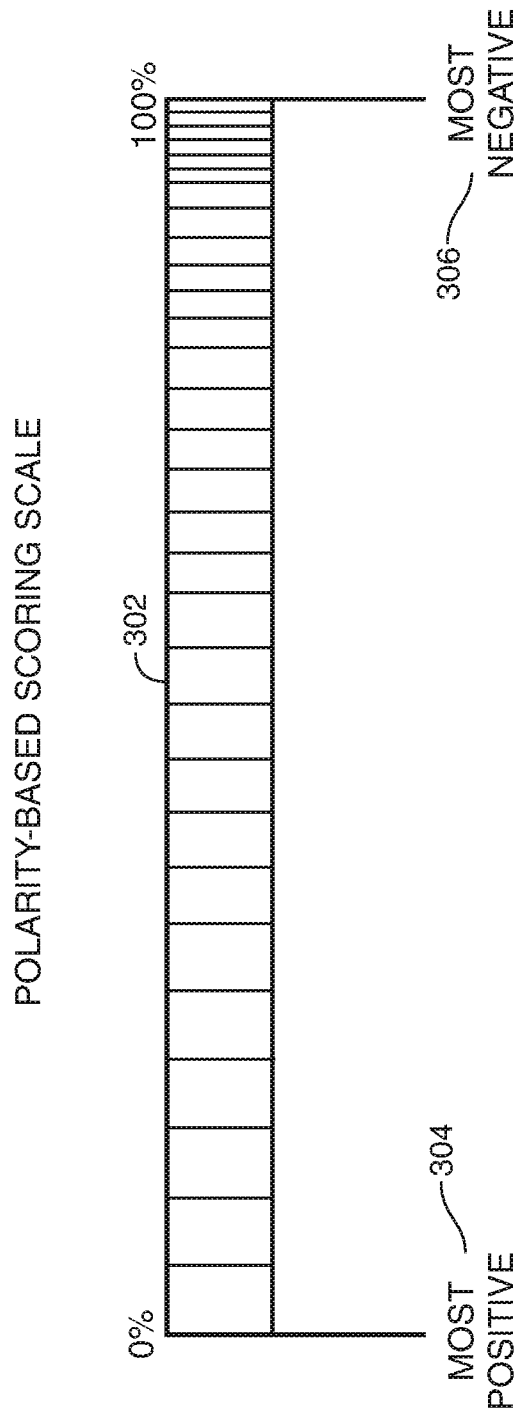
FIG. 3 shows another illustrative diagram in accordance with principles of the invention.
Figure 4:
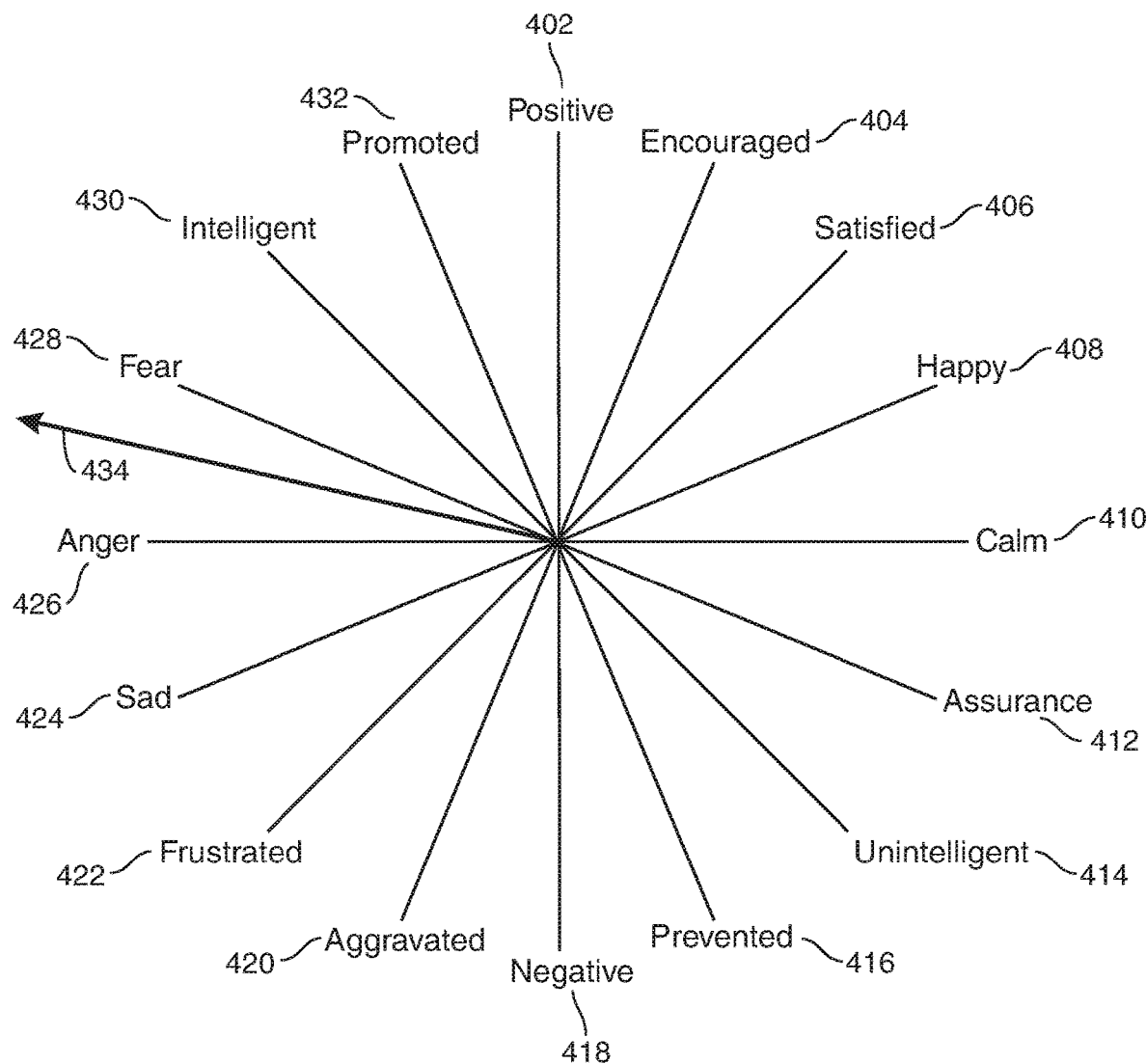
FIG. 4 shows another illustrative diagram in accordance with principles of the invention.
Figure 5:
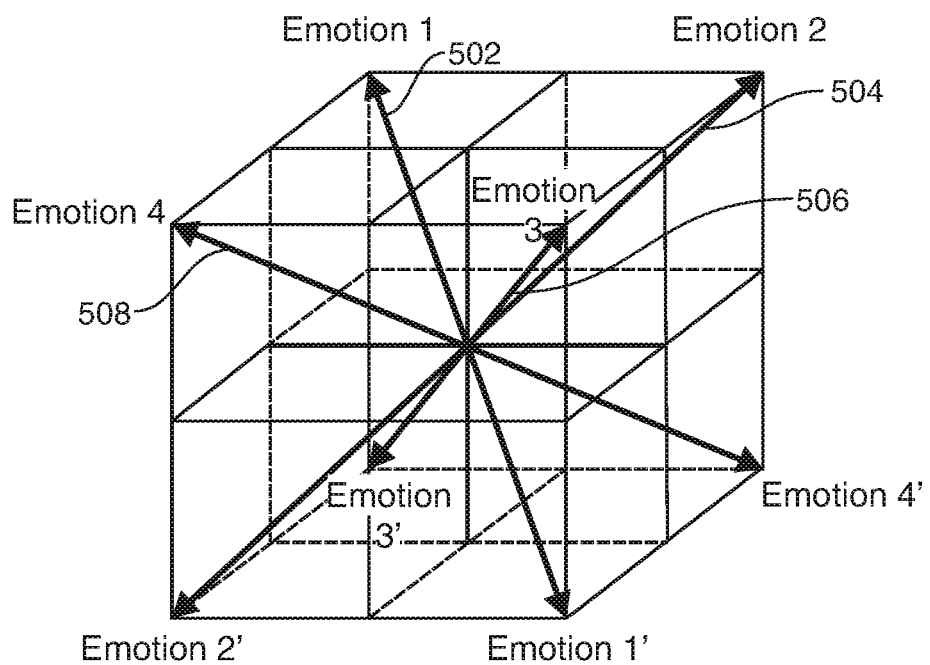
FIG. 5 shows another illustrative diagram in accordance with principles of the invention.

FIGS. 3, 4 and 5 may show illustrative methods for scoring communications. The methods of scoring of the communications may be used for each of the searches that may be performed in accordance with principles of the disclosure.

It should be appreciated that the methods illustrated in FIGS. 3, 4 and 5 may also be implemented Oil the facial sentiment data and biometric data captured by the smart sensors. Facial expressions and biometric data—i.e.—a first biometric characteristic and a second biometric characteristic, may be compared to pre-determined normal ranges, Based on the comparison, the data can be scored to be either a more positive or more negative sentiment score. The methods for scoring the facial sentiment data and biometric data may use one of the illustrated scoring methods described in FIGS. 3, 4 and 5.

FIG. 3 shows an illustrative scoring scale. There may be various different methods or scales for scoring communications. For example, a communication may be scored based on positive or negative sentiment. A communication may be scored based on polar emotions, such as happy or sad. A communication may be scored in a non-polar scale, such as a vector scaling model. A communication may be scored on a collection of multiple sentiment scoring methods or models.

Polarity-based scoring scale 302 is shown in FIG. 3. In such a scoring scale, each communication is scored on a polar scale using linguistic scoring methodology. Linguistic scoring methodology may utilize various language scoring methods, such as natural language processing, computational linguistics and biometrics. The language scoring methodology may also include text analysis. The text analysis may analyze various components of the text. It should be appreciated that, to a human reader, certain text components, such as sarcasm, exaggerations or jokes may be easily understood. However, a computer may require special methods to ensure that such linguistic terms are not misinterpreted. Therefore, the text analysis may analyze key words and phrases, emoticons, characters, length of response, response time between communications, related communications, negation, exaggeration, jokes and sarcasm. Based on the linguistic scoring methodology, each communication may be scored on a scale of 0% to 100%, as shown at 304 and 306. 0% may indicate most positive and 100% may indicate most negative.

It should be appreciated that a polarity-based scale may include two opposite emotions, whether positive and negative, happy and sad or any other suitable opposite emotions. Therefore, each communication scored on a polarity-based score may only be given a score based on the polarity of the communication. However, at times, in order to compensate for the shortcomings of the polarity-based scoring models, a communication may be scored on multiple polarity-based scoring models, and, the results of the scoring models may be combined.

Communications, in accordance with some embodiments, may be scored to determine whether there may be any slight negative sentiment associated with the pre-determined entity. Therefore, for the safety and protection of the entity, the pre-determined threshold score for determining negative sentiment included in a communication may be as low as 10%. This pre-determined threshold may be used when performing a first search on the internet for negative sentiment associated with the pre-determined entity.

In the event that one or more communications may be identified including negative sentiment towards the pre-determined entity, the second search—i.e.—keyword search, may be performed. The second search may search for keywords. The keywords may identify a physical location associated with the pre-determined entity and identify an intended action linking to the pre-determined entity. In some embodiments, when one or more instances of communications are identified to include the searched keywords, the pre-determined entity may be alerted to heighten security in the area surrounding the specified location. In response to the alert, sensors positioned in proximity to the physical location may be activated.

In certain embodiments, prior to alerting the pre-determined entity, the one or more instances of communications may be scored based on the level of negative sentiment included in the communication. The pre-determined threshold score for determining a level of negative sentiment on these communications may be raised to a higher percentage. The pre-determined threshold score may be 20%. The pre-determined threshold score may be 30%. The score may be adjusted in order to limit any unnecessary provisions taken at the identified location associated with the pre-determined entity.

FIG. 4 shows a multi-dimensional scoring scale. The multi-dimensional scoring scale may include a plurality of vectors. Each of the vectors may correspond to a different emotion or sentiment. The emotions, or sentiments shown, may include positive (402), encouraged (404), satisfied (406), happy (408), calm (410), assurance (412), unintelligent (414), prevented (416), negative (418), aggravated (420), frustrated (422), sad (424), anger (426), fear (428), intelligent (430) and promoted (432).

Vector 434 may be a vector generated from a communication. The communication may include a plurality of attributes. The communication may be broken down into component parts. The attributes and the component parts may be used to plot the communication on the multi-dimensional scoring scale.

The sentiment of the communication plotted as vector 434 may be shown inbetween anger and sad. It should be appreciated that the multi-dimensional scoring scale may be used to determine the sentiment of a communication. The multi-dimensional scoring scale may include a plurality of other emotions, not shown. In some embodiments, the multi-dimensional scoring scale may utilize any suitable emotion chart.

FIG. 5 shows another multi-dimensional scoring scale. The multi-dimensional may be three-dimensional. The three-dimensional scoring scale may include an x-dimension (horizontal), a y-dimension (vertical) and a z-dimension (depth). Vectors that represent emotions may be plotted on the three-dimensional scoring scale.

A vector may have multiple dimensions, such as an x-dimension, a y-dimension and a z-dimension. As such, a vector may be plotted on the three-dimensional scoring scale that comprises an x-dimension, y-dimension and z-dimension. Each plotted emotion may be represented by a vector, such as vector 502 that represents emotion 1, vector 504 that represents emotion 2, vector 506 that represents emotion 3 and vector 508 that represents emotion 4.

Build of a vector, or orientation of a vector, could be based on one or more of a combination of sentiments or emotions. In some embodiments, vector length could correspond to magnitude or intensity of a vector.

Each plotted vector that represents an emotion may have two extremes. For example, a vector may represent a range of happiness and sadness. Each point of the vector may represent a different extreme in the range of happiness and sadness. At the (0,0,0) point, the vector may represent neutrality (neither happy nor sad). Location points found on the vector above the (0,0,0) point may represent a gradually increasing degree of happiness, while location points found below the (0,0,0) point may represent a gradually increasing degree of sadness.

Upon the receipt of an unlabeled communication, the communication may be broken down into component parts. The component parts may be used to generate a vector. The vector may be plotted on a multi-dimensional scoring scale, such as the one shown in FIG. 5.

In some embodiments, the emotion vector, or vectors, that most closely represent the sentiment of the communication may be displayed to a user. In certain embodiments, a detailed score comprising the various components of the communication may be shown. For example, a communication may be determined to include 20% fear, 40% anger, 30% frustrated and 10% sad. For such a communication, the entire breakdown may be shown and/or the single most dominant attribute—anger may be shown. In some embodiments, the only displayed sentiment may be positive or negative.

Figure 6:
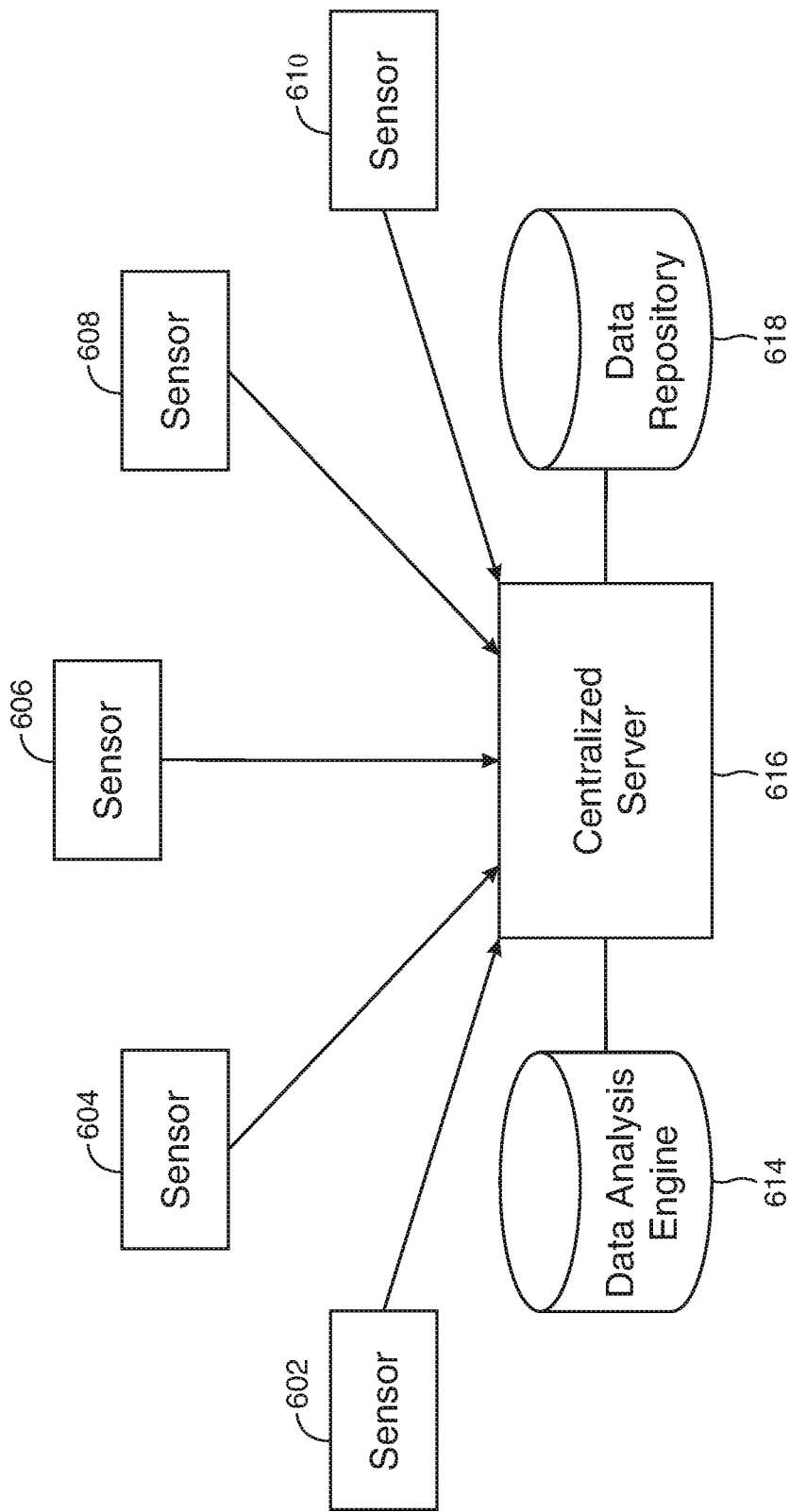
FIG. 6 shows illustrative system architecture in accordance with principles of the invention.

FIG. 6 shows illustrative system architecture 600. System architecture 600 may include a network of smart sensors 602, 604, 606, 608 and 610. The network of smart sensors may not be limited to only the illustrated smart sensors 602-610.

The smart sensors may be in direct communication with a centralized server 618. The centralized server 618 may implement a data analysis engine 614 to analyze the data captured by the smart sensors 602-610. The centralized server 616 may communicate with data repository 618. Data repository 618 may be assist in the execution of machine learning algorithms on the captured data in order to identify the sentiment of the captured data. The captured data may be stored in the data repository 618.

The smart sensors 602-610 may be situated within proximity to an identified physical location associated with the pre-determined entity in accordance with the principles of the disclosure. Sensors 602-610 may be enabled to capture at least audio, video, still images, a first biometric characteristic, a second biometric characteristic, a third biometric characteristic and a fourth biometric characteristic.

It should be appreciated that sensors 602-610 may capture data without identifying an identity of any one or more individuals. The camera sensors may be used to capture emotions, expressions and surrounding activity without analyzing the identity of an individual.

In embodiments of the disclosure, sensors 602-610 may include devices that detect biometric data and facial sentiment data.

Sensors in general may include devices that detect changes in a physical or virtual environment. For example sensors may measure audio, rainfall, or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Sensors may be positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node.

Contextually, captured data may provide information not only about the physical environment surrounding a sensor, but the capturing of data from multiple sensors may provide data that signifies an event.

Timing of when data is captured by sensors 602-610 may be controlled. For example, data may be captured in real-time or at pre-defined intervals such as once a day. Data may also be captured in response to a detected status change. When the sensors 602-610 are in a passive state, they may capture data at a slower pace. The rate may be once every 5 minutes. The rate may be a few times an hour. The rate may be increased and/or decreased depending on the time of the day. When the sensors are triggered to be in an active state, they may be able to capture data at an increased rate. Sensors may be enabled to capture data at a rate of 1000 readings per second. Such rates may assist in the ability to quickly capture and identify signs and/or warning that may signify plans for an intended action. The identifying may then enable preventing intended and unwanted actions to occur at the identified location.

Data analysis engine 614 may perform pattern recognition to identify correlations and trends in captured data in order to more accurately detect any signs of plans and/or means for performing an intended action.

Thus, methods and apparatus for analyzing communications on the internet to better secure the entities are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for analyzing communications on the internet to identify a probability of an occurrence of an anomalous event relating to a predetermined entity and for taking one or more remedial measures to mitigate the probability, the method comprising:

searching periodically, one or more webpages, via a data analysis engine located on a centralized server, to identify communications comprising negative sentiment associated with the pre-determined entity;

identifying, during the searching, one or more communications comprising negative sentiment data associated with the pre-determined entity;

in response to the identifying, performing a keyword search on the one or more webpages, the keyword search comprising:

searching to identify a communication comprising at least a first keyword identifying a physical location associated with the pre-determined entity and a second keyword identifying an intended action linking to the pre-determined entity, the second keyword within a predetermined proximity to the first keyword;

identifying the communication comprising at least the first keyword and the second key word; and in response to the identifying, executing, on the one or more webpages, a targeted keyword search to identify one or more instances of the first and second keywords identified on the communication, wherein, when one or more instances are identified:

switching a plurality of smart sensors embedded within proximity to the identified physical location, from a passive state to an active state, the plurality of smart sensors being in communication with the centralized server, the active state instructing the smart sensors to capture:
  non-personally identifiable biometric data positioned proximal to each of the smart sensors; and
  non-personally identifiable facial sentiment data positioned proximal to each of the smart sensors;
transmitting the captured biometric data and the captured facial sentiment data to a centralized server; and
based on an analysis of the captured biometric and facial sentiment data via a data analysis engine linked to the centralized server, confirming the probability of the occurrence of the anomalous event above a threshold probability occurrence; and
in response to the confirming, sending a message to an associated security entity.

2. The method of claim 1 wherein the predetermined proximity is within a range of zero to ten words.

3. The method of claim 1 wherein the capturing, via the smart sensors, of the non-identifiable biometric data comprises capturing a first biometric characteristic, a second biometric characteristic and a third biometric characteristic.

4. The method of claim 1 wherein the capturing, via the smart sensors of the non-personally identifiable facial sentiment data comprises capturing facial landmarks including eyes and eye corners, brows, mouth corners and a nose tip.

5. The method of claim 4 wherein each smart sensor comprises a sensor, a microprocessor and supporting wireless communication and the smart sensors enabling transmitting the captured biometric data and facial sentiment data to the centralized server.

6. The method of claim 3 wherein the analysis comprises:
scoring the first biometric characteristic by comparing the first biometric characteristic to a pre-determined standard for the first biometric characteristic;
scoring the second biometric characteristic by comparing the second biometric characteristic to a pre-determined standard for the second biometric characteristic;
scoring the third biometric characteristic by comparing the third biometric characteristic to a pre-determined standard for the third biometric characteristic;
adding, at least two of, the first biometric characteristic score, the second biometric characteristic score and the third biometric characteristic score, to determine a total score;
determining an average score based off of the total score; and
when the average score is above a pre-determined threshold level, confirming the probability of the occurrence of the anomalous event.

7. The method of claim 1 further comprising, following the confirming, performing a lock-down on the identified physical location associated with the pre-determined entity.

8. The method of claim 1 wherein the triggering comprises triggering the resetting of the smart sensors from a dormant state to the active state.

9. The method of claim 1 wherein the passive state comprises capturing data at a first rate per minute and the active state comprises capturing data at a second rate per minute, the second rate per minute being greater than the first rate per minute.

10. The method of claim 1 wherein the searching to identify communications comprising negative sentiment data further comprises:
analyzing, using text analysis, the one or more communications, to identify negative sentiment, the text analysis analyzing key words and phrases, emoticons, characters, negation, exaggerations, jokes and/or sarcasm.

11. A system for analyzing communications on the internet to identify a probability of an anomalous event relating to a pre-determined entity and for taking one or more remedial measures to mitigate the probability, the system comprising:
a centralized server in communication with the pre-determined entity, the centralized server comprising a data analysis engine, the data analysis engine configured to:
  search periodically, one or more webpages, to identify communications comprising negative sentiment data associated with the pre-determined entity;
  identify, during the search, one or more communications comprising negative sentiment data associated with the pre-determined entity; and
  in response to the identifying, perform a keyword search on the one or more webpages, the keyword search comprising:
    searching to identify a communication comprising at least a first keyword identifying a physical location and a second keyword identifying an intended action linking to the pre-determined entity, the second keyword within a predetermined proximity to the first keyword;
    identifying the communication comprising at least the first keyword and the second keyword; and
    in response to the identifying, execute, on the one or more webpages, a targeted keyword search to identify one or more instances of the first and second keywords identified on the communication,
a network of smart sensors positioned in proximity to the identified physical location, each smart sensor comprising a sensor, a microprocessor and supporting wireless communication, the network of smart sensors being in direct communication with the centralized server, the network of smart sensors configured to monitor non-personally identifiable attributes;
wherein, when one or more instances are identified:
  the network of smart sensors are configured to switch from a passive state to an active state, the active state instructing the smart sensors to capture:
    non-personally identifiable biometric data positioned proximal to each of the smart sensors; and
    non-personally identifiable facial sentiment data positioned proximal to each of the smart sensors;
  the centralized server configured to:
    receive the captured biometric data and the captured facial sentiment data from each of the sensors;
    based on an analysis of the captured biometric and facial sentiment data, via a data analysis engine linked to the centralized server, confirm a probability of an occurrence of the anomalous event above a threshold probability occurrence; and
    in response to the confirming, send a message to an associated security entity.

12. The system of claim 11 wherein the predetermined proximity is within a range of zero to ten words.

13. The system of claim 11 wherein the capturing, via the smart sensors, of the non-personally identifiable biometric data comprises capturing a first biometric characteristic, a second biometric characteristic and a third biometric characteristic.

14. The system of claim 13 wherein the data analysis engine is configured to:
   score the first biometric characteristic by comparing the first biometric characteristic to a pre-determined standard first biometric characteristic;
   score the second biometric characteristic by comparing the second biometric characteristic to a pre-determined standard second biometric characteristic;
   score the third biometric characteristic by comparing the third biometric characteristic to a pre-determined standard third biometric characteristic;
   add at least two of the first biometric characteristic score, the second biometric characteristic score and the third biometric characteristic score, to determine a total score;
   determine an average score based off of the total score; and
   when the average score is above a pre-determined threshold level, confirm the probability the occurrence of the anomalous event.

15. The system of claim 11 wherein, in response to the identifying of the one or more communications comprising negative sentiment data, the data analysis engine is configured to:
   analyze, using text analysis, the one or more communications, the text analysis analyzing key words and phrases, emoticons, characters, negation, exaggerations, jokes and/or sarcasm.

16. The system of claim 15 wherein, in response to the analyzing, the data analysis engine is configured to determine a sentiment score tor the one or more communications, the sentiment score being based on natural language processing, computational linguistics, biometrics and the text analysis.

17. The system of claim 16 wherein, when at least one of the one or more communications comprises the sentiment score being above a predetermined threshold, the data analysis engine is configured to search for the first and second keyword associated with the predetermined entity in the communications.

* * * * *